Figure 1:
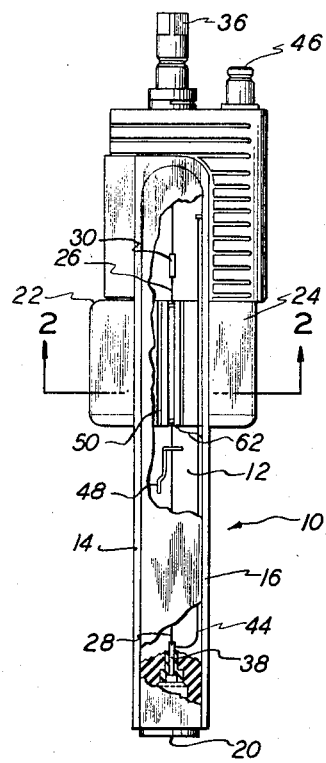

Oct. 6, 1959 H. A. BEALL, JR., ET AL 2,907,952
GALVANOMETERS
Filed Dec. 24, 1956

INVENTORS.
HORACE A. BEALL, JR.
DONALD N. MONTGOMERY
BY
Christie, Parker & Hale
ATTORNEYS United States Patent Office 2,907,952
Patented Oct. 6, 1959

2,907,952

GALVANOMETERS

Horace A. Beall, Jr., Downey, and Donald N. Montgomery, Glendora, Calif., assignors to Consolidated Electrodynamics Corporation, Pasadena, Calif., a corporation of California Application December 24, 1956, Serial No. 630,116

2 Claims. (Cl. 324—97)

This invention relates to improvements in galvanometers of the type adapted to respond to alternating or oscillating voltages, and more particularly to the type of laboratory and portable galvanometer used in oscillographs.

A typical galvanometer comprises a suspension system which extends through the interior of the body of the galvanometer. The suspension system comprises a lightweight coil which is suspended by a pair of fine wires anchored at opposite ends of the body of the galvanometer. A small mirror is affixed to the upper portion of the suspension system a short distance above the galvanometer coil so as to move in accordance with the deflection of the coil. When current flows through the coil it rotates through an angle until the torsional restoring torque of the suspension is equal and opposite to a magnetic torque caused by a pair of magnetic poles positioned in the plane of the galvanometer coils. The angular deflection of the coils is proportional to the current through the coil.

The coil suspension means in the form of conductive wire or ribbon provide electrical leads to the galvanometer coil, the upper suspension means conventionally being anchored to one terminal post sealed through an end of the galvanometer case and providing one external contact. The lower suspension means is generally anchored to a lower suspension post. In present practice a fine wire lead is attached to the anchoring means and is carried upwardly in the casing and through a side wall thereof into an exteriorly mounted terminal housing wherein it is mechanically held in contact with a second terminal post. The terminal housing is normally mounted at the upper end of a galvanometer case in proximity to the first external contact described above, to facilitate connection in an oscillograph.

A recording oscillograph galvanometer is often used under conditions wherein large potentials are present between the case and the galvanometer coils. Examples of such conditions are the testing of aircraft and industrial, or power-generating equipment during actual operating conditions. A high external potential influence causes a potential difference to exist between the coils and the case of a magnitude which will cause electrostatic forces to act on the coil causing spurious deflection of the coil. This spurious deflection, of course, results in errors in the recording data.

Several methods have been tried to reduce this electrostatic deflection without requiring that an insulator be positioned between the galvanometer case and the magnetic block into which the case is placed. If insulation is placed between the case and the mounting block, a larger instrument is required in order to obtain useful data. For many purposes a large instrument is undesirable. Most of the methods tried to reduce the electrostatic deflections have been unsuccessful. However, we have succeeded in inventing a galvanometer of miniature size and which includes therein a very effective electrostatic shielding means which substantially eliminates the effects of electrostatic forces in the galvanometer coil area.

The invention contemplates the insertion of a conductive, non-magnetic member about the galvanometer coils. Means are provided for isolating the conductive, non-magnetic member from the magnet poles and the case.

Figure 2:
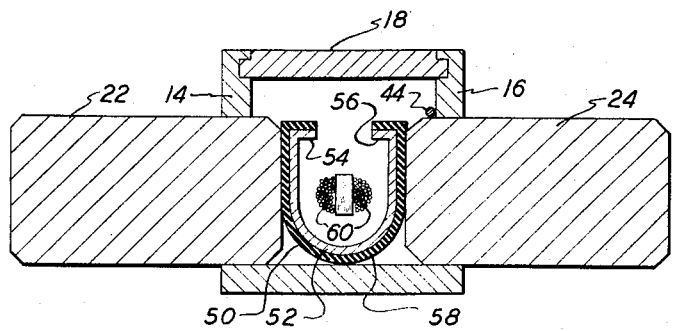

The invention will be more clearly understood with reference to the accompanying drawings, in which:

Fig. 1 is an elevation of a galvanometer of the type to which the invention is directed, with a portion of the front wall of the case cut away; and Fig. 2 is an enlarged view taken along lines 2—2 of Fig. 1.

The galvanometer shown in elevation in Fig. 1 comprises a case 10 in the form of a square or rectangular sectioned box, the length of which is many times its cross-sectional dimension. The case comprises a rear wall 12 and side walls 14 and 16. A cover 18 of substantially the same shape as the back wall 12 is slidably engaged in grooves formed in the side members 14 and 16. The cover is held on the case by a screw 20 and may be removed for access to the interior of the case by removal of the screw 20.

A pair of pole pieces 22 and 24 are fastened through the sides 14 and 16, respectively, of the case, defining a relatively narrow gap within the case symmetrically arranged about the longitudinal axis thereof. Pole pieces 22 and 24 extend outwardly from the side walls 14 and 16 of the case and are adapted for engagement in a suitable magnet block (not shown).

An elongated coil, consisting of a large number of fine wire windings, and shaped to occupy a very small cross-sectional area, is suspended in the gap between the pole pieces. The coil is suspended in the gap by the opposing upper and lower suspension wires 26, 28, respectively, the suspension wires being connected to the coil termini to provide electrical leads to the coil. A small rectangular mirror 30 is attached to the upper suspension wire in alignment with a window (not shown) in the side wall 14 of the case whereby a beam of light may be directed on the mirror through rotatably mounted lenses (not shown) and reflected back through the respective lenses for sensing deflection of the coil within the air gap between the poles 22 and 24.

The upper suspension wire 26 is anchored to a terminal post 36 sealed through the upper end of the casing and providing one external contact. The detailed construction of the terminal post 36 and the manner of mounting the same through the end of case 10 forms no part of the present invention.

The lower suspension wire 28 is bonded to lower suspension terminal member 38. By means of the screw 20, tension on suspension wire 28 may be adjusted. Transverse vibration of suspension 28 is prevented by vibration damper 48.

A fine wire lead 44 is connected at one end to member 38. Lead 44 is carried upwardly in the case for connection to a second external contact 46.

In accordance with the invention a conductive, non-magnetic shield, which is insulated from the magnetic poles 22 and 24, and case 10, is inserted in the air gap between poles 22 and 24. The shield and insulator are indicated generally by the numeral 50 in Fig. 1. The length of the shield and the insulator is approximately the same as the length of the side edges of the pole pieces 22 and 24. The shape of the shield and the insulating member is such as to substantially enclose the galvanometer coil located between the pole pieces.

The structure of one type of electrostatic shielding means is shown more clearly in Fig. 2 which is an enlarged horizontal section taken along the lines 2—2 of Fig. 1. The electrostatic shield 52 is U-shaped in cross-section and has turned-in portions 54 and 56. Mounted about the shield 52 is an insulator member 58 of the same shape as the shield 52. Shield 52 may consist of brass or any other conductive, non-magnetic material; the insulator 58 may consist of any insulating material. As shown in Fig. 2 the electrostatic insulating means is inserted between the galvanometer coils 60 and the magnetic pole pieces 22 and 24.

A wire lead 62 (see Fig. 1) has one end thereof attached to the shield 52 and the other end thereof connected to suspension terminal 38. Shield 52 is at the same potential as one end of the coil 60. When current flows between terminals 36 and 46, the shield 52 and the wire 62 connected between the shield and the terminal member 38 are at a different potential than the casing 10 which is usually grounded. Hence, any electrostatic forces resulting from a high potential in the vicinity of the casing causes the electrostatic force lines to terminate on the wire 62 and shield 52.

Since the insulator 58 isolates the shield 52 and the coil 60 from the magnetic pole pieces 22 and 24, and case 10, the galvanometer coil 60 has no case potential reference and thus is less susceptible to damage from accidental grounding of a large potential through the suspension of from case to magnet block.

Hence, we have provided a means for maintaining the galvanometer coil area free of electrostatic forces. The size of the casing is not increased thereby and hence remains of miniature size, which is highly desirable. The length and width of casing 10 are 2.44 inches and about .50 inch, respectively. The length of the shield and the insulator is about .60 inch. Their width depends upon the gap between the pole pieces. Since the shield and insulator dimensions are made according to the dimensions of the casing, the size of the galvanometer is not increased by the inclusion of the shield and insulator.

Further advantage of this new device is noted because of the higher potential which may be applied between the galvanometer case and the suspension with less danger of an electric spark to the case from the galvanometer coil. These sparks might otherwise be caused by a high potential transient which could be applied during tests.

We claim:

1. In a galvanometer having a wire coil suspended between magnet poles by opposed suspension means connected to suspension terminals, and a galvanometer case enclosing the coil and the suspension means, the improvement which comprises a conductive, non-magnetic shield disposed within the case to substantially enclose the wire coil, an insulator disposed within the case to electrically isolate the shield and coil from the galvanometer case, and a lead coupling the shield to a suspension terminal.

2. In a galvanometer having a wire coil suspended between magnet poles by opposed suspension means connected to suspension terminals, and a galvanometer case enclosing the coil and the suspension means, the improvement which comprises a conductive, non-magnetic shield disposed within the case and shaped to substantially completely enclose the wire coil, a wire lead coupling the shield to a suspension terminal, and an insulating member having the same shape as the shield mounted within the case around the shield to electrically isolate the shield and coil from the galvanometer case.

References Cited in the file of this patent

UNITED STATES PATENTS

| | | |
|---|---|---|
| 701,937 | Robinson | June 10, 1902 |
| 1,267,266 | Porter | May 21, 1918 |
| 2,416,780 | Tellier | Mar. 4, 1947 |
| 2,425,407 | Washburn | Aug. 12, 1947 |
| 2,571,776 | Staff | Oct. 16, 1951 |
| 2,657,358 | Richardson | Oct. 27, 1953 |